United States Patent
Komori

(10) Patent No.: US 8,104,970 B2
(45) Date of Patent: Jan. 31, 2012

(54) WHEEL BEARING APPARATUS FOR A VEHICLE

(75) Inventor: Kazuo Komori, Iwata (JP)

(73) Assignee: NTN Corporation (JP)

(*) Notice: Subject to any disclaimer, the term of this patent is extended or adjusted under 35 U.S.C. 154(b) by 0 days.

(21) Appl. No.: 12/818,259

(22) Filed: Jun. 18, 2010

(65) Prior Publication Data

US 2010/0254643 A1 Oct. 7, 2010

Related U.S. Application Data

(63) Continuation of application No. PCT/JP2008/003811, filed on Dec. 17, 2008.

(30) Foreign Application Priority Data

Dec. 19, 2007 (JP) .................................. 2007-327004

(51) Int. Cl.
*F16C 33/80* (2006.01)
*B60B 35/18* (2006.01)
(52) U.S. Cl. ........................................ 384/480; 384/544
(58) Field of Classification Search .................. 384/480, 384/484, 544, 589
See application file for complete search history.

(56) References Cited

U.S. PATENT DOCUMENTS 7,507,029 B2 * 3/2009 Komori et al. ................ 384/589

FOREIGN PATENT DOCUMENTS

| JP | 2004-108449 | * | 4/2004 |
| JP | 2005-147298 | | 6/2005 |
| JP | 2006-010055 | | 1/2006 |
| JP | 2007-177814 | | 7/2007 |

* cited by examiner

*Primary Examiner* — William C Joyce
(74) *Attorney, Agent, or Firm* — Harness, Dickey & Pierce, P.L.C.

(57) ABSTRACT

A vehicle wheel bearing apparatus has an outer member, an inner member with a wheel hub and inner ring, double row rolling elements contained between the inner member and the outer member, and; seals mounted between the outer member and the inner member. A stepped portion is formed between an inner side surface of the wheel mounting flange and its base. The stepped portion is formed with a circular arc cross-section with a predetermined radius of curvature. An annular recessed portion is formed on an inner circumference of the outer side end of the outer member. The recessed portion is arranged opposite to a corner edge of the stepped portion, via a small gap. The gap forms an annular labyrinth seal having a substantially "L" shaped cross-section.

6 Claims, 8 Drawing Sheets

[Fig 1]
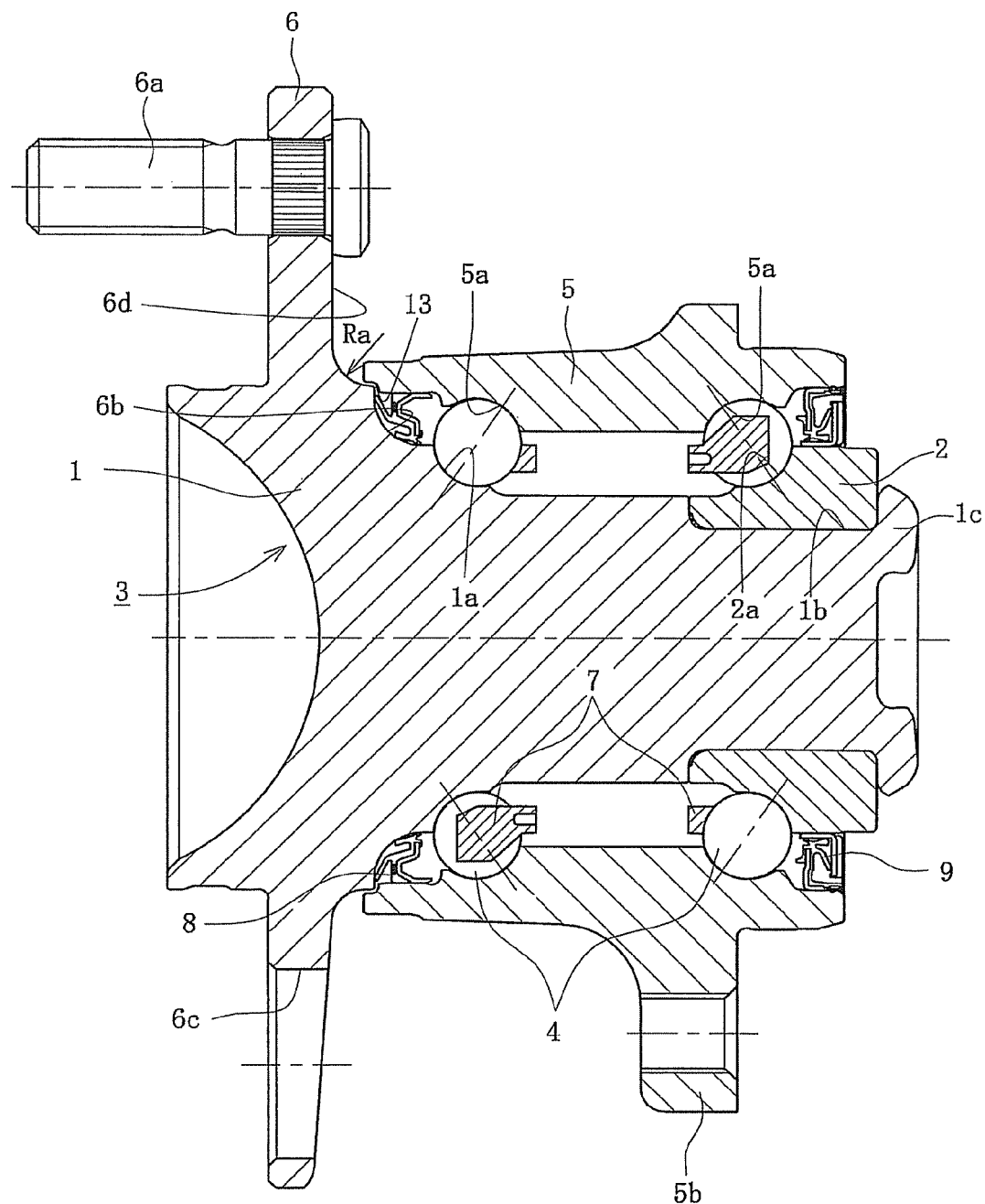

[Fig 2]
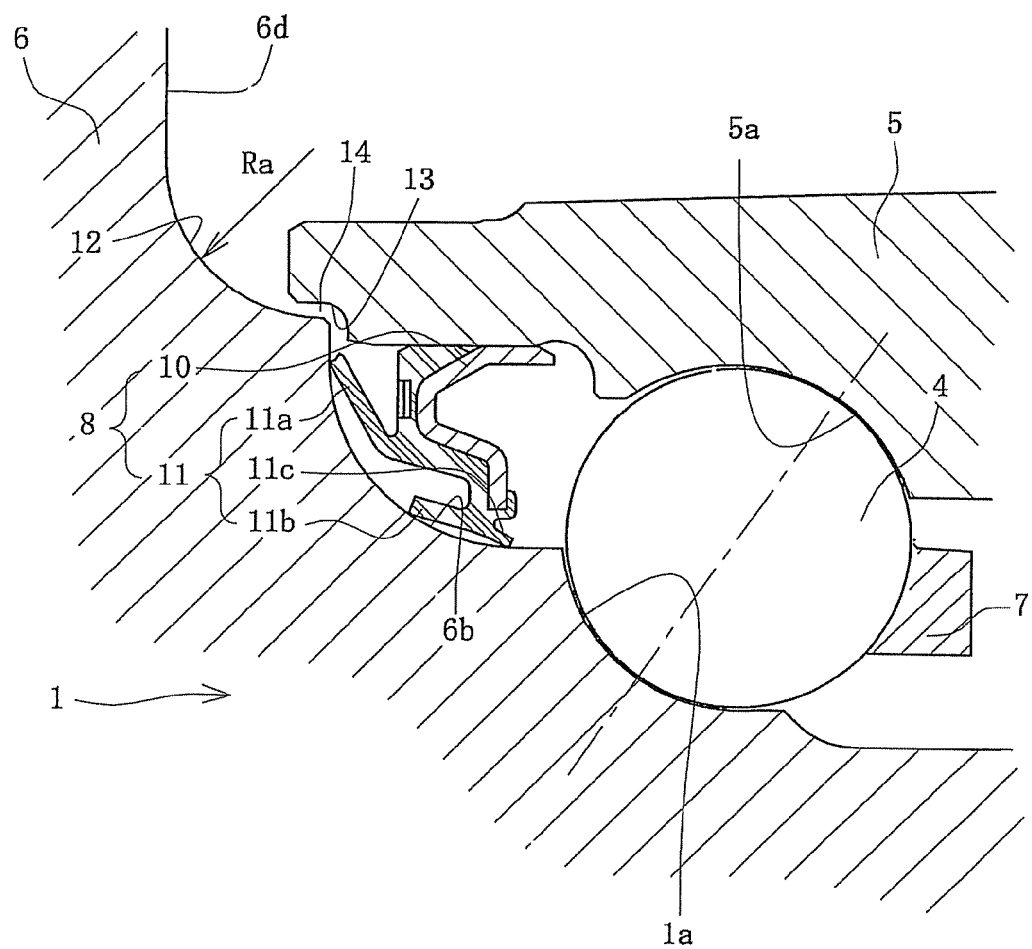

[Fig 3]
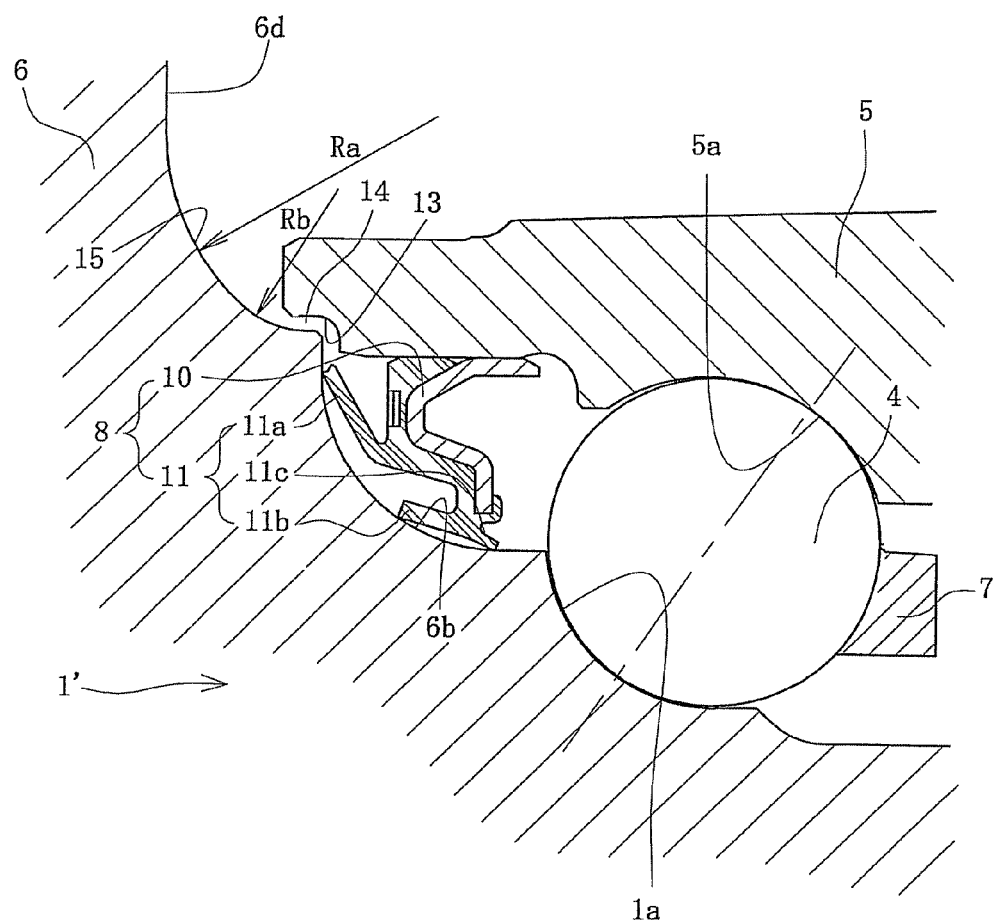

[Fig 4]
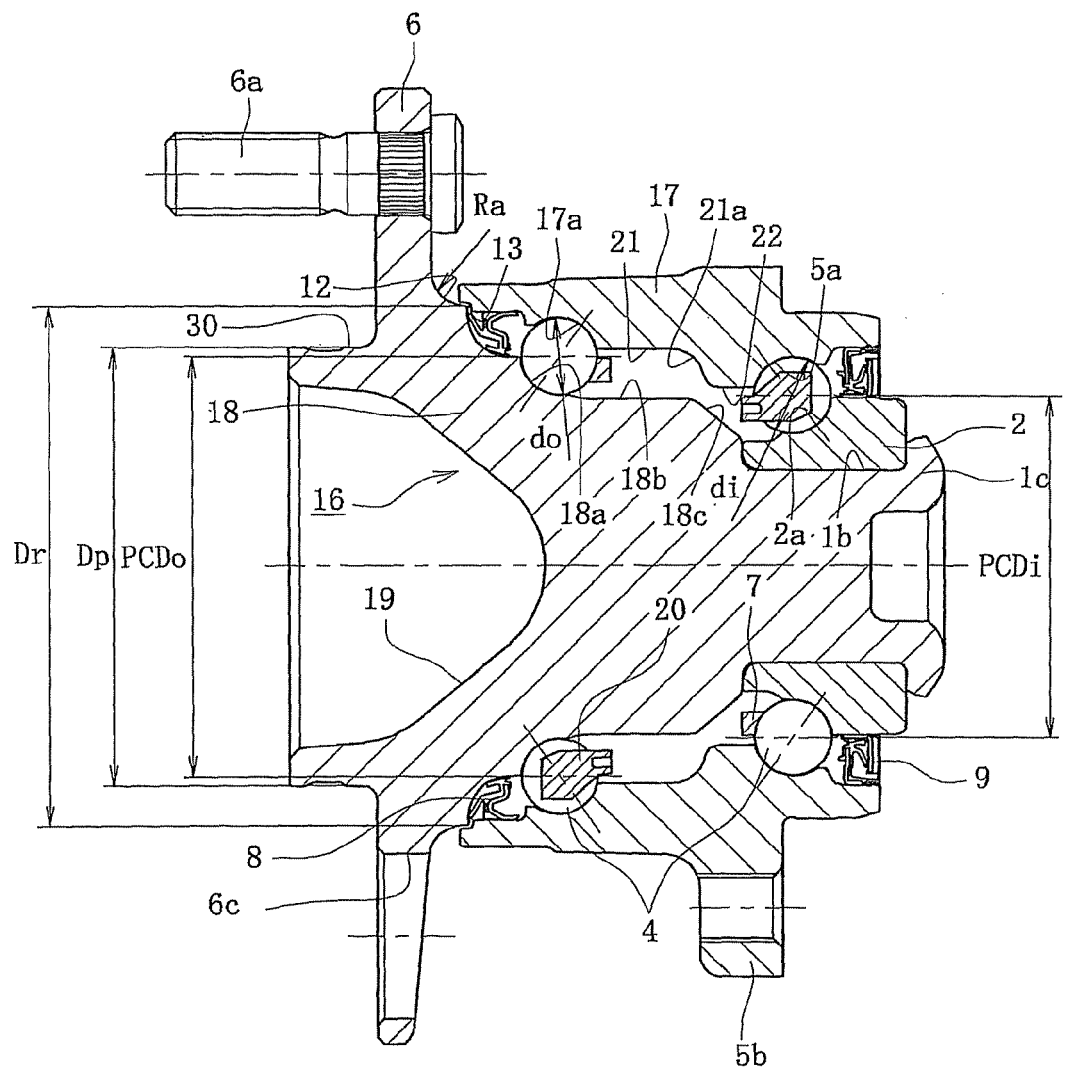
PCDo>PCDi
do=di
Zo>Zi

[Fig 5]
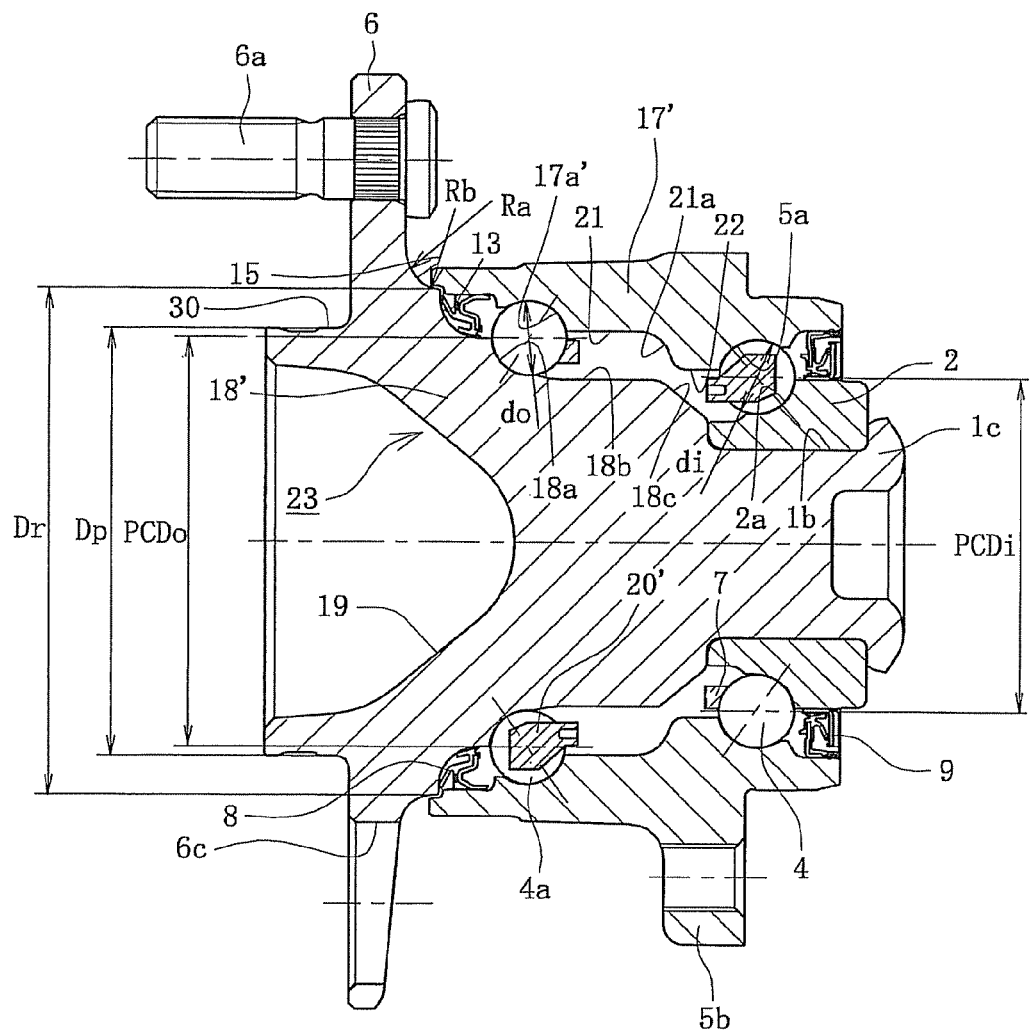
PCDo>PCDi
do<di
Zo>Zi

[Fig 6]
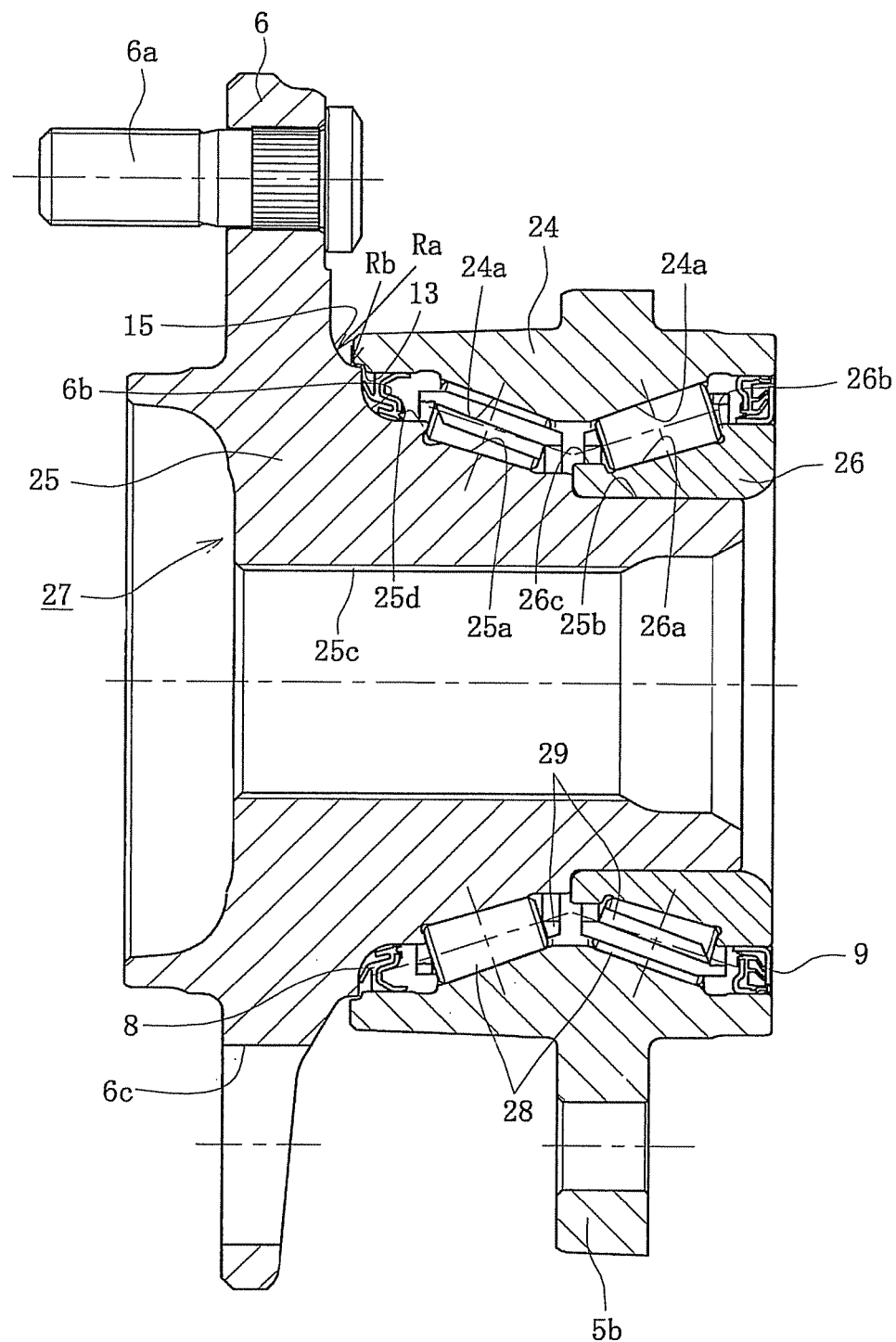

[Fig 7]
PRIOR ART
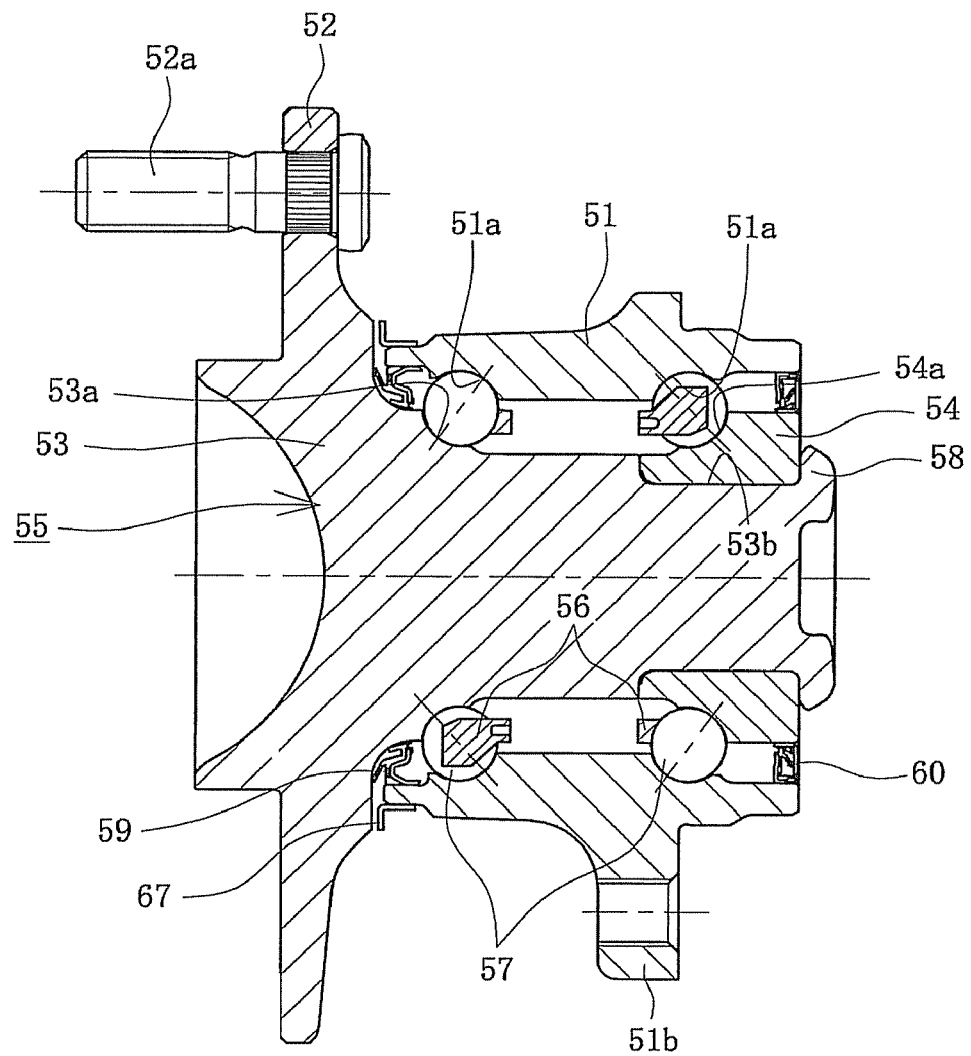

[Fig 8]
PRIOR ART
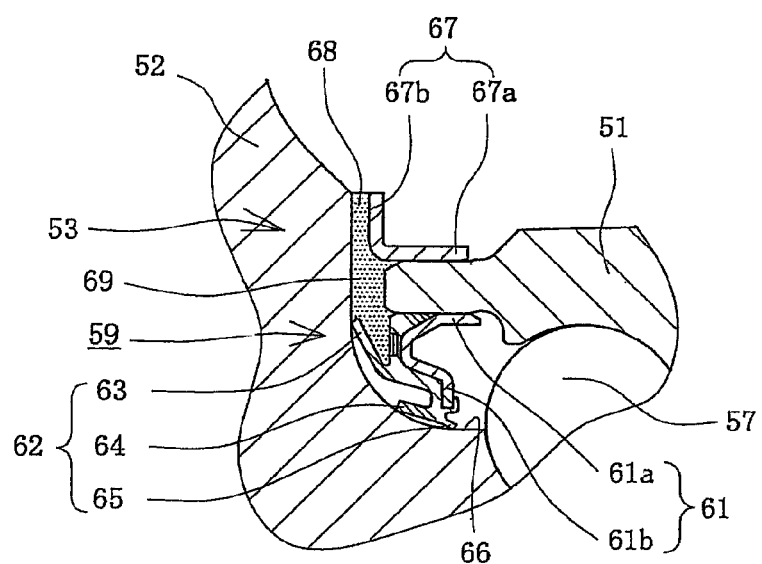

WHEEL BEARING APPARATUS FOR A VEHICLE

CROSS-REFERENCE TO RELATED APPLICATIONS

This application is a continuation of International Application No. PCT/JP2008/003811, filed Dec. 17, 2008, which claims priority to Japanese Application No. 2007-327004, filed Dec. 19, 2007. The disclosures of the above applications are incorporated herein by reference.

FIELD

The present disclosure relates to a vehicle wheel bearing apparatus that rotatably supports a wheel of a vehicle, such as an automobile, relative to a suspension device and, more particularly, to a vehicle wheel bearing apparatus intended to improve its sealability and durability to extend the life of the wheel bearing apparatus.

BACKGROUND

The vehicle wheel bearing apparatus for supporting a wheel rotatably supports a wheel hub to mount via a rolling bearing, a driving wheel and/or a driven wheel. For structural reasons, an inner ring rotation type is used for the driving wheel and both the inner ring rotation type and the outer ring rotation type are used for the driven wheel. In general, the wheel bearing apparatus is classified into a so-called first generation type, second generation type, third generation type and a fourth generation type. In the first generation type, the wheel bearing includes double row angular ball bearings fit between a knuckle and a wheel hub. In the second generation type, a body mounting flange or a wheel mounting flange is directly formed on the outer circumference of an outer member. In the third generation type, one of inner raceway surfaces is directly formed on the outer circumference of the wheel hub. In the fourth generation type, the inner raceway surfaces are directly formed on the outer circumferences, respectively, of the wheel hub and an outer joint member of a constant velocity universal joint.

The wheel bearing apparatus is provided with seals to prevent leakage of grease contained within the bearing apparatus. Also, the seals prevent ingress of rain water or dust from the outside into the bearing apparatus. It is desirable to have an automotive bearing apparatus that has a long life while being maintenance-free. Under the circumstances, it has been proved that many causes of bearing apparatus failure are based on troubles in the seals rather than peeling or breakage of structural elements of the bearings. Accordingly, it is very important to improve the sealability of bearing apparatus in order to extend its life.

Several seals have been proposed to improve their sealability. One example of a wheel bearing apparatus of the prior art where one seal is incorporated is shown in FIG. 7. In descriptions below, the term "outer side" defines a side that is positioned outside of a vehicle body (left-hand side in drawings). The term "inner side" defines a side that is positioned inside of a vehicle body (right-hand side in drawings) when the bearing apparatus is mounted on the vehicle body.

The illustrated vehicle wheel bearing apparatus is a third generation type used for a driven wheel. It includes an outer member 51 formed with a body mounting flange 51b on its outer circumference. The mounting flange 51b is to be mounted on a knuckle (not shown) of a vehicle. The outer member inner circumference includes double row outer raceway surfaces 51a, 51a. An inner member 55 includes a wheel hub 53 and an inner ring 54. The wheel hub 53 is formed at one end with a wheel mounting flange 52. The wheel hub outer circumference includes one inner raceway surface 53a opposing one of the double row outer raceway surfaces 51a, 51a. A cylindrical portion 53b axially extends from the inner raceway surface 53a. The inner ring 54 is press-fit onto the cylindrical portion 53b of the wheel hub 53. The inner ring outer circumference includes the other inner raceway surface 54a opposing the other of the double row outer raceway surfaces 51a, 51a. Double row rolling elements 57, 57 are freely rollably contained between the outer and inner raceway surfaces 53a, 54a of the inner member 55 and the outer raceway surfaces 51a, 51a of the outer member 51.

Hub bolts 52a are arranged on the wheel mounting flange 52 equidistantly along its periphery. The inner ring 5 is axially secured on the wheel hub 53 by a caulked portion 58. The caulked portion 58 is formed by plastically deforming the end of the cylindrical portion 53b. Seals 59, 60 are mounted within annular openings formed between the outer member 51 and the inner member 55. The seals 59, 60 prevent leakage of grease contained in the bearing and the ingress of rainwater and dust into the bearing from the outside.

The outer side seal 59 includes a metal core 61 and a sealing member 62 integrally adhered to the metal core 61, via vulcanized adhesion as shown in an enlarged view of FIG. 8. The metal core 61 includes a cylindrical press-fit portion 61a that fits into the outer member 51. An inner portion 61b extends radially inward from the press-fit portion 61a. The metal core 61 is formed with a substantially "L" shaped cross-section.

The sealing member 62 is formed from elastic material such as synthetic rubber. The sealing member 62 is secured on a radially inner portion 61b of the metal core 61 surrounding the radially inner tip end of the metal core 61. The sealing member 62 includes radially outer and inner side lips 63, 64. The inner side lips 63, 64 bent radially outward so that they are urged onto a ground surface of the base of the wheel mounting flange 52. The sealing member further includes a radial lip 65 arranged on the tip end of the radially inner portion 61b. The radial lip 65 is adapted to be urged onto a ground corner portion 66 of the wheel mounting flange 52.

In addition, a shielding plate 67 is mounted on the outer circumference of the outer member 51. The shielding plate 67 includes a cylindrical portion 67a fit onto the outer member 51 and a standing portion 67b that extends radially outward from the cylindrical portion 67a. The shield plate is formed with a substantially "L" shaped cross section. The standing portion 67b is arranged opposite to the base of the wheel mounting flange 52, via a predetermined gap therebetween, to form a labyrinth seal 68.

The labyrinth seal 68 can prevent the ingress of rain water and dust from the outside. Thus, this ensures a sufficient sealing function although the interference of the side lips 63, 64 of the seal 59 is reduced. Thus, it is possible to reduce friction torque caused by the seal 59 and accordingly to improve the fuel consumption of the vehicle. See, Japanese Laid-open Patent Publication No. 147298/2005.

Thus, it is possible in the prior art wheel bearing apparatus to reduce the friction torque caused by the seal 59. Accordingly, this improves the fuel consumption of the vehicle due to the provision of the labyrinth seal 68. Also, it prevents the ingress of foreign matters 69 such as rain water, muddy water or dust into the inside of the wheel bearing apparatus by two side lips 63, 64 if the foreign matters should pass through the labyrinth seal 68.

However, the ability for flexible deformation of the side lip 63 is substantially detracted when muddy water and dust that enters into a space outside the side lip 63 through the labyrinth seal 68 solidifies. The suppression of flexible deformation of the side lip 63 will not only cause an increase of the rotational torque but will also detract from the desired sealability due to wearing of the side lip 63 caused by sand or dust adhered to the tip of the side lip 63. In addition, the possibility exists that rust will be formed on the outer member 51 and the wheel hub 53 by the muddy water dwelled in the space outside the side lip 63. Thus, not only will the relative rotation between them be obstructed but noise or vibration will be caused by the growing rust. Also, peeled rust will damage the side lip 63 of the seal 59 and thus further detract from its sealability.

SUMMARY

Accordingly, it is an object of the present disclosure to provide a wheel bearing apparatus that improves the sealability and durability of the seal of the wheel bearing apparatus and thus extends its life.

To achieve the object, a vehicle wheel bearing apparatus is provided that comprises an outer member formed with a body mounting flange on its outer circumference. The body mounting flange is to be mounted on part of a suspension apparatus of the vehicle. The outer member inner circumference includes double row outer raceway surfaces. An inner member includes a wheel hub and an inner ring or an outer joint member of a constant velocity universal joint. The wheel hub is formed with a wheel mounting flange on one end. The wheel hub outer circumference includes one inner raceway surface positioned opposite to one of the double row outer raceway surfaces. A cylindrical portion axially extends from the inner raceway surface. The inner ring is press-fit onto the cylindrical portion of the wheel hub. The inner ring is formed with the other inner raceway surface on its outer circumference. The other inner raceway opposes the other of the double row outer raceway surfaces. Double row rolling elements are freely rollably contained between the inner raceway surfaces of the inner member and the outer raceway surfaces of the outer member. Seals are mounted within annular openings formed between the outer member and the inner member. The outer side seal of the seals slidably contacts a base, with a circular arc cross-section, of the inner side of the wheel mounting flange. A stepped portion, annular recessed portion with a circular arc cross-section where excessive material is scooped away to reduce the weight of the wheel hub, is formed between an inner side surface of the wheel mounting flange and its base. The stepped portion is formed with a circular arc cross-section with a predetermined radius of curvature. An annular recessed portion is formed on an inner circumference of the outer side end of the outer member. The recessed portion is arranged opposite to a corner edge of the stepped portion, via a small gap, the gap forms an annular labyrinth seal with a substantially "L" shaped cross-section.

A third or fourth generation wheel bearing apparatus has an inner side base of the wheel mounting flange formed with a circular arc cross-section that contacts the outer side seal. A stepped portion is formed between an inner side surface of the wheel mounting flange and its base. The stepped portion is formed with a circular arc cross-section with a predetermined radius of curvature. An annular recessed portion is formed on an inner circumference of the outer side end of the outer member. The recessed portion is arranged opposite to a corner edge of the stepped portion, via a small gap. The gap forms an annular labyrinth seal with a substantially "L" shaped cross-section. In view of the above, it is possible to relax the stress concentration caused on the wheel hub by a bending moment loaded on the wheel mounting flange. Thus, this improves the strength and durability of the wheel hub. In addition, the labyrinth seal can prevent direct exposure of the seal to rain water or dust. Thus, it provides a vehicle wheel bearing apparatus with improved sealability, durability and a long life.

The stepped portion is formed with a combined circular arc cross-section with two predetermined radii of curvatures. This makes it possible to further relax the stress concentration caused on the wheel hub by a bending moment loaded on the wheel mounting flange by double effects of increase of material volume and of distribution of stress obtained by a combined radius as compared with a single radius.

A pitch circle diameter of the rolling elements of outer side row of the double row rolling elements is set larger than the pitch circle diameter of the rolling elements of the inner side row of the double row rolling elements. The outer diameter of the stepped portion is set larger than the outer diameter of a pilot portion. This makes it possible to relax stress not only in the corner of the inner side stepped portion but also in the corner of the pilot portion of the wheel mounting flange. Thus, this improves both the rigidity and strength of the bearing.

The number of the rolling elements of the outer side row is set larger than the number of rolling elements of the inner side row. This increases the outer side bearing rigidity as compared with the inner side bearing rigidity in co-operation with the enlargement of the pitch circle diameter of the outer side inner raceway surface.

The diameter of each of the rolling elements of the outer side row is set smaller than the diameter of each of the rolling elements of the inner side row. This makes it possible to increase the outer side bearing rigidity more than the inner side bearing rigidity while suppressing an increase of the bearing diameter. Thus, this reduces the size and weight of the bearing.

A substantially axially extending conical recess is formed on the outer side end of the wheel hub. It extends to near the bottom of the inner raceway surface of the outer side. Thus, the recess makes the wall thickness of the outer side of the wheel hub substantially constant. This achieves a contradictory object of size reduction and increases the rigidity of the wheel bearing apparatus.

A cylindrical portion of a larger diameter and a cylindrical portion of a smaller diameter are formed on the inner circumference of the outer member between the double row outer raceway surfaces. A tapered stepped portion is formed between the cylindrical portions. The bottom diameter of the outer raceway surface of the inner side is substantially the same as the diameter of the larger cylindrical portion. This achieves a contradictory object of size reduction and increases rigidity of the wheel bearing apparatus.

The vehicle wheel bearing apparatus of the present disclosure comprises an outer member formed with a body mounting flange on its outer circumference. The body mounting flange is to be mounted on part of a suspension apparatus of the vehicle. The outer member inner circumference includes double row outer raceway surfaces. An inner member includes a wheel hub and an inner ring or an outer joint member of a constant velocity universal joint. The wheel hub is formed, on one end, with a wheel mounting flange. The wheel hub outer circumference includes one inner raceway surface positioned opposite to one of the double row outer raceway surfaces. A cylindrical portion axially extends from the inner raceway surface. The inner ring is press-fit onto the cylindrical portion of the wheel hub. The inner ring outer circumference includes the other inner raceway surface positioned opposite to the other of the double row outer raceway surfaces. Double row rolling elements are freely rollably contained between the inner raceway surfaces of the inner member and the outer raceway surfaces of the outer member. Seals are mounted within annular openings formed between the outer member and the inner member. The outer side seal of the seals slidably contacts a base. The base includes a circular arc cross-section of the inner side of the wheel mounting flange. A stepped portion is formed between an inner side surface of the wheel mounting flange and its base. The stepped portion is formed with a circular arc cross-section with a predetermined radius of curvature. An annular recessed portion is formed on an inner circumference of the outer side end of the outer member. The recessed portion is arranged opposite to a corner edge of the stepped portion, via a small gap. The gap forms an annular labyrinth seal with a substantially "L" shaped cross-section. Thus, it is possible to relax the stress concentration caused on the wheel hub by a bending moment loaded on the wheel mounting flange. This improves the strength and durability of the wheel hub. In addition, the labyrinth seal can prevent direct exposure of the seal to rain water or dust. Thus, a vehicle wheel bearing apparatus is provided with improved sealability and durability as well as an extended life.

A vehicle wheel bearing apparatus comprises an outer member formed with a body mounting flange on its outer circumference. The body mounting flange is to be mounted on part of a suspension apparatus of the vehicle. The outer member inner circumference includes double row outer raceway surfaces. An inner member includes a wheel hub and an inner ring or an outer joint member of a constant velocity universal joint. The wheel hub is formed, on one end, with a wheel mounting flange. The wheel hub outer circumference has one inner raceway surface positioned opposite to one of the double row outer raceway surfaces. A cylindrical portion axially extends from the inner raceway surface. The inner ring is press-fit onto the cylindrical portion of the wheel hub. The inner ring outer circumference includes the other inner raceway surface positioned opposite to the other of the double row outer raceway surfaces. Double row rolling elements are freely rollably contained between the inner raceway surfaces of the inner member and the outer raceway surfaces of the outer member. Seals are mounted within annular openings formed between the outer member and the inner member. The outer side seal of the seals slidably contacts a base. The base has a circular arc cross-section of the inner side of the wheel mounting flange. A stepped portion is formed between an inner side surface of the wheel mounting flange and its base. The stepped portion is formed with a circular arc cross-section with a predetermined radius of curvature. An annular recessed portion is formed on an inner circumference of the outer side end of the outer member. The recessed portion is arranged opposite to a corner edge of the stepped portion, via a small gap. The gap forms an annular labyrinth seal having a substantially "L" shaped cross-section.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal section view of a first preferred embodiment of the vehicle wheel bearing apparatus.

FIG. 2 is a partially enlarged view of an outer side seal of FIG. 1.

FIG. 3 is a partially enlarged view of a second preferred embodiment of the vehicle wheel bearing apparatus.

FIG. 4 is a longitudinal section view of a third preferred embodiment of the vehicle wheel bearing apparatus.

FIG. 5 is a longitudinal section view of a fourth preferred embodiment of the vehicle wheel bearing apparatus.

FIG. 6 is a longitudinal section view of a fifth preferred embodiment of the vehicle wheel bearing apparatus.

FIG. 7 is a longitudinal section view of a prior art wheel bearing apparatus.

FIG. 8 is a partially enlarged view of an outer side seal of FIG. 7.

DETAILED DESCRIPTION

Preferred embodiments of the present disclosure will be hereinafter described with reference to the drawings.

FIG. 1 is a longitudinal section view of a first embodiment of the vehicle wheel bearing apparatus of the present disclosure. FIG. 2 is a partially enlarged view of an outer side seal of FIG. 1.

The vehicle wheel bearing apparatus is a third generation type used for a driven wheel. An inner member 3 includes a wheel hub 1 and an inner ring 2 secured onto the hub member 1. An outer member 5 is fit onto the inner member 3 via double row balls 4, 4.

The wheel hub 1 is integrally formed with a wheel mounting flange 6 at one end. One (outer side) inner raceway surface 1a is formed on the wheel hub outer circumference. A cylindrical portion 1b axially extends from the inner raceway surface 1a. Hub bolts 6a are arranged on the wheel mounting flange 6 equidistantly along its periphery. Circular apertures 6c are formed between the hub bolts 6a. These apertures 6c contribute to weight reduction of the wheel hub 1. Additionally, the apertures 6c can be used for passages of a fastening tool, such as a wrench, used to assemble and disassemble a brake apparatus (not shown).

The inner ring 2 is press-fit onto the cylindrical portion 1b of the wheel hub 1, via a predetermined interference. The inner ring outer circumference includes the other (inner side) inner raceway surface 2a. The inner ring 2 is axially secured on the cylindrical portion 1b of the wheel hub 1 by a caulked portion 1c. The caulked portion 1c is formed by plastically deforming the end of the cylindrical portion 1b.

The outer member 5 is integrally formed with a body mounting flange 5b on its outer circumference. The body mounting flange 5b is to be mounted on a knuckle (not shown) of a vehicle. The outer member inner circumference includes double row outer raceway surfaces 5a, 5a positioned opposite to the inner raceway surfaces 1a, 2a of the inner member 3. Double row balls 4, 4 are contained between the outer raceway surfaces 5a, 5a and inner raceway surfaces 1a, 2a of the inner member 3. The balls 4, 4 are rollably held by cages 7, 7. Seals 8, 9 are mounted within annular openings formed between the outer member 5 and the inner member 3. The seals 8, 9 prevent leakage of grease contained in the bearing and the ingress of rainwater or dust into the bearing from the outside.

The wheel hub 1 is made of medium/high carbon steel including carbon of 0.40-0.80% by weight such as S53C. The wheel hub 1 is hardened by high frequency induction quenching so that a region from an inner side base 6b of the wheel mounting flange 6 to the cylindrical portion 1b, including the inner raceway surface 1a, is hardened to have a surface hardness of 50-64 HRC. The caulked portion 1c is not quenched and remains as is with its surface hardness after forging.

The outer member 5 is made of medium/high carbon steel including carbon of 0.40-0.80% by weight such as S53C. At least the surfaces of the double row outer raceway surfaces 5a, 5a are hardened by high frequency induction quenching to have a surface hardness of 58-64 HRC. On the other hand, the inner ring 2 and balls 4 are made of high carbon chrome steel such as SUJ2. They are hardened to their core by dip quenching to have a surface hardness of 58-64 HRC.

As shown in the enlarged view of FIG. 2, the outer side seal 8 includes a metal core 10 press fit into the inner circumference of the outer side end of the outer member 5. A sealing member 11 is integrally adhered to the metal core 10 via vulcanized adhesion. The metal core 10 is press-formed from an austenitic-stainless steel sheet (JIS SUS 304 etc.), ferritic-stainless steel sheet (JIS SUS 430 etc.) or preserved cold rolled steel sheet (JIS SPCC etc.). It has an "L" shaped cross-section.

The sealing member 11 is formed from synthetic rubber such as nitrile rubber. The sealing member 11 includes a pair of side lips 11a, 11b in sliding contact with the inner side base 6b of the wheel mounting flange 6. The base 6b is formed with a circular arc cross-section. The side lips 11a, 11b are inclined radially outward. A grease lip 11c is inclined radially inward toward the inside of the bearing. The side lip 11a is inclined radially outward. Thus, muddy water that would enter into the side lip 11a through the labyrinth seal 14 will flow toward the bottom of an annular space of a V-shaped cross-section formed by the side lip 11a and the body of the sealing member 11. The muddy water will be discharged therefrom without dwelling on the slide-contacting portion of the side lip 11a. Thus, high sealability can be achieved.

A stepped portion 12 is formed between an inner side surface 6d of the wheel mounting flange 6 and its base 6b. The stepped portion 12 is an annular recessed portion with a circular arc cross-section with a radius of curvature Ra. Excessive material is scooped away, forming the stepped portion 12, to reduce the weight of the wheel hub 1 and thus to reduce the thickness of the wheel mounting flange 6. In addition, the stepped portion 12 can relax the stress concentration caused on the wheel hub 1 by a bending moment loaded on the wheel mounting flange 6. Thus, this improves the strength and durability of the wheel bearing apparatus.

An annular recessed portion 13 is formed on an inner circumference of the outer side end of the outer member 5. The annular recessed portion 13 is arranged opposite to a corner edge of the stepped portion 12, via a small gap. The small gap forms an annular labyrinth seal 14 with a substantially "L" shaped cross-section. The labyrinth seal 14 prevents direct exposure of the seal 8 to rain water or dust. Thus, it provides a vehicle wheel bearing apparatus with improved sealability, durability and a long life. Although shown with a wheel bearing apparatus of the third generation type, the present disclosure may be applied to that of the fourth generation type where inner raceway surfaces are directly formed on an outer circumference of a wheel hub.

FIG. 3 is a partially enlarged longitudinal section view of a second preferred embodiment of the vehicle wheel bearing apparatus of the present disclosure. Since the second embodiment is different from the first embodiment only in the structure of the step of the wheel mounting flange, the same reference numerals are used in this embodiment to designate the same parts having the same functions as those used in the first embodiment. Thus, their detailed description will be omitted.

According to the second embodiment, the stepped portion 15 is formed with a combined circular arc cross-section with two predetermined radii of curvatures Ra, Rb. This makes it possible to reduce the weight of the wheel hub 1' and to further relax the stress concentration caused on the wheel hub 1' by a bending moment loaded on the wheel mounting flange 6. Thus, this further increases the strength and durability of the wheel bearing apparatus. Also in this embodiment, the annular recessed portion 13 is formed on an inner circumference of the outer side end of the outer member 5. The annular recessed, portion 13 is arranged opposite to a corner edge of the stepped portion 15, via a small gap. The gap forms an annular labyrinth seal 14 with a substantially "L" shaped cross-section. The labyrinth seal 14 prevents direct exposure of the seal 8 to rain water or dust. Thus, it improves the sealability and durability of the seal 8.

As a result of determination of stress caused in the wheel hub 1' according to a FEM analysis, it has been found that a stress relaxation of about 20% can be achieved by setting a single radius of curvature Ra=R8. A stress relaxation of about 27% can be achieved by setting a combined radius of curvature of Ra=R8 and Rb=R3 in comparison with the case where the corner R of the stepped portion 15 is Ra=R1.2. It is supposed that this is attained by an effect of an increase of material volume at the stepped portion 15 and the stress distribution effect achieved by the combined radius of curvature.

FIG. 4 is a longitudinal section view of a third preferred embodiment of the vehicle wheel bearing apparatus of the present disclosure. The third embodiment is different from the first embodiment (FIG. 1) only in the structure of the bearing. The same reference numerals are used in this embodiment to designate the same parts having the same functions of those used in the first embodiment. Thus, their detailed description will be omitted.

The vehicle wheel bearing apparatus of this embodiment is a third generation type used for a driven wheel. The bearing apparatus includes an inner member 16, an outer member 17, and double row balls 4, 4 rollably contained between the inner member 16 and outer member 17. The inner member 16 includes a wheel hub 18 and an inner ring 2 press fit onto the wheel hub 18, via predetermined interference.

The wheel hub 18 is integrally formed with a wheel mounting flange 6 at its one end, one (outer side) inner raceway surface 18a is formed on the wheel hub outer circumference. A cylindrical portion 1b extends from the inner raceway surface 18a. The cylindrical portion 1b includes a shaft-shaped portion 18b and a chamfered portion 18c.

The wheel hub 18 is made of medium/high carbon steel including carbon of 0.40-0.80% by weight such as S53C. The wheel hub 18 is hardened by high frequency induction quenching so that a region from an inner side base 6b of the wheel mounting flange 6 to the cylindrical portion 1b, including the inner raceway surface 18a, is hardened to have a surface hardness of 50-64 HRC.

The outer member 17 is integrally formed with a body mounting flange 5b on its outer circumference. The outer member inner circumference includes an outer side outer raceway surface 17a opposite to the inner raceway surface 18a of the wheel hub 18 and an inner side outer raceway surface 5a opposite to the inner raceway surface 2a of the inner ring 2. Double row balls 4, 4 are contained between these outer raceway surfaces 17a, 5a and inner raceway surfaces 18a, 2a. The balls 4, 4 are rollably held by cages 20, 7.

The outer member 17 is made of medium/high carbon steel including carbon of 0.40-0.80% by weight such as S53C. The surfaces of the double row outer raceway surfaces 17a, 5a are hardened by high frequency induction quenching to have a surface hardness of 58-64 HRC.

A pitch circle diameter PCDo of the outer side group of balls 4 is set larger than a pitch circle diameter PCDi of the inner side group of balls 4 (PCDo>PCDi). The diameter "do" of each of balls 4 of the outer side row is set the same as the diameter "di" of each of balls 4 of the inner side row (do=di). Due to a difference in the pitch circle diameters PCDo and PCDi, the number "Zo" of the balls 4 of the outer side row is set larger than the number "Zi" of the balls 4 of inner side row (Zo>Zi). This increases the outer side bearing rigidity compared with the inner side bearing rigidity and thus extends the bearing life.

A substantially axially extending conical recess 19 is formed at an outer side end portion of the wheel hub 18. The recess 19 is formed by forging and extends to near the bottom of the outer side inner raceway surface 18a of the wheel hub 18. Thus, the outer side end portion of the wheel hub 18 has a substantially constant wall thickness. Due to a difference in the pitch circle diameters PCDo and PCDi, the groove bottom diameter of the inner raceway surface 18a of the wheel hub 18 is formed larger than the groove bottom diameter of the inner raceway surface 2a of the inner ring 2. The outer diameter of the shaft shaped portion 18b is formed larger than the groove bottom diameter of the inner raceway surface 2a.

On the other hand, due to the difference in the pitch circle diameters PCDo and PCDi, the groove bottom diameter of the outer raceway surface 17a is formed larger than the groove bottom diameter of the outer raceway surface 5a. A larger cylindrical shoulder portion 21, a rounded corner portion 21a and a smaller cylindrical shoulder portion 22 are arranged between the outer side outer raceway surface 17a and inner side outer raceway surface 5a. The groove bottom diameter of the outer raceway surface 5a is formed substantially the same as the inner diameter of the larger cylindrical shoulder portion 21. The wheel hub 18 and the outer member 17 structure solve contradictory problems of reducing the size and weight of the bearing apparatus.

Also in this embodiment, a stepped portion 12 is formed between an inner side surface 6d of the wheel mounting flange 6 and its base 6b. The stepped portion 12 is an annular recessed portion with a circular arc cross-section with a radius of curvature Ra. The stepped portion 12 can reduce the weight of the wheel hub 18 and relax the stress concentration caused on the wheel hub 18 by a bending moment loaded on the wheel mounting flange 6 in co-operation with the enlargement of the pitch circle diameter PCDo of the outer side inner raceway surface.

An annular recessed portion 13 is formed on an inner circumference of the outer side end of the outer member 17. The annular recessed portion 13 is arranged opposite to a corner edge of the stepped portion 12, via a small gap. The gap forms an annular labyrinth seal 14 with a substantially "L" shaped cross-section. The labyrinth seal 14 prevents direct exposure of the seal 8 to rain water or dust and thus improves the sealability and durability of the seal 8.

The outer diameter Dr of the stepped portion 12 is set larger than the outer diameter Dp of a pilot portion 30 (Dr>Dp). This makes it possible to increase the thickness and rigidity of the pilot portion 30. Thus, this suppresses deformation of the pilot portion 30 although the pilot portion 30 is loaded near its root. That is, it makes it possible to reduce the stress in the corners not only of the stepped portion 12 but of the pilot portion 30. Thus, this achieves an increase of the rigidity and strength of the wheel bearing apparatus.

FIG. 5 is a longitudinal section view of a fourth preferred embodiment of the vehicle wheel bearing apparatus of the present disclosure. Since this fourth embodiment is different from the third embodiment (FIG. 4) only in the specification of the rolling elements and the structure of the stepped portion, the same reference numerals are used in this embodiment to designate the same parts having the same functions as those used in the third embodiment. Thus, their detailed description will be omitted.

The vehicle wheel bearing apparatus of this embodiment is a third generation type used for a driven wheel. It includes an inner member 23, an outer member 17', and double row balls 4a, 4 rollably contained between the inner member 23 and outer member 17'. The inner member 23 includes a wheel hub 18' and an inner ring 2 press fit onto the wheel hub 18'.

In this embodiment, a pitch circle diameter PCDo of the outer side group of balls 4a is set larger than a pitch circle diameter PCDi of the inner side group of balls 4 (PCDo>PCDi). The diameter "do" of each of balls 4a of the outer side row is set smaller than the diameter "di" of each of balls 4 of the outer side row (do<di). Due to the differences in the pitch circle diameters PCDo and PCDi and the ball diameters do and di, the number "Zo" of the balls 4a of the outer side row is set larger than the number "Zi" of the balls 4 of inner side row (Zo>Zi). This increases the outer side bearing rigidity as compared with the inner side bearing rigidity while suppressing an increase of the diameter of the wheel bearing apparatus. Also, it reduces the size and weight of the bearing apparatus compared with the third embodiment.

According to this embodiment, the stepped portion 15 is formed with a combined circular arc cross-section with two predetermined radii of curvatures Ra, Rb. This makes it possible to reduce the weight of the wheel hub 18' and to further relax the stress concentration created on the wheel hub 18' by a bending moment loaded on the wheel mounting flange 6. Thus, this further increases the strength and durability of the wheel bearing apparatus. Also in this embodiment, the annular recessed portion 13 is formed on an inner circumference of the outer side end of the outer member 17'. The annular recess portion 13 is arranged opposite to a corner edge of the stepped portion 15 via a small gap. The gap forms an annular labyrinth seal 14 having a substantially "L" shaped cross-section. The labyrinth seal 14 prevents direct exposure of the seal 8 to rain water or dust. Thus, this improves the sealability and durability of the seal 8.

FIG. 6 is a longitudinal section view of a fifth preferred embodiment of the vehicle wheel bearing apparatus of the present disclosure. Since this fifth embodiment is different from the fourth embodiment (FIG. 5) only in the structure of the bearing portion, the same reference numerals are used in this embodiment to designate the same parts having the same functions as those used in the fourth embodiment. Thus, their detailed description will be omitted.

The vehicle wheel bearing apparatus of this embodiment is a third generation type used for a driving wheel. It includes an outer member 24, an inner member 27, and double row tapered rollers 28 rollably contained between the outer member 24 and inner member 27. The inner member 27 includes a wheel hub 25 and an inner ring 26 press fit onto the wheel hub 25.

The outer member 24 is integrally formed with a body mounting flange 5b on its outer circumference. The outer member inner circumference includes tapered double row outer raceway surfaces 24a, 24a.

The outer member 24 is made of high carbon chrome bearing steel such as SUJ2 or cement steel. The high carbon chrome bearing steel is hardened to its core to have a hardness of 58-64HRC. It is tempered at a temperature of 160-200° C. after quenching at a temperature of 820-860° C. On the other hand, the cement steel is hardened to have a surface hardness of 58-64 HRC. Similarly to the outer member, the inner ring 26 and tapered rollers 28 are made of high carbon chrome bearing steel and hardened to its core to have a hardness of 58-64 HRC.

The wheel hub 25 is integrally formed with a wheel mounting flange 6 at its outer side end portion. The wheel hub outer circumference has a tapered inner raceway surface 25a opposing one (outer side one) of the double row outer raceway surfaces 24a, 24a. A cylindrical portion 25b axially extends from the inner raceway surface 25a. The wheel hub inner circumference includes a serration (or spline) 25c. The inner ring 26 is formed with a tapered inner raceway surface 26a on its outer circumference. The tapered inner raceway surface 26a opposes the other (inner side one) of the double row outer raceway surfaces 24a, 24a. The inner ring is press fit onto the cylindrical portion 25b via a predetermined interference.

The wheel hub 25 is made of medium/high carbon steel such as S53C including carbon of 0.40~0.80% by weight. The wheel hub 25 has a region from a base 6b of the wheel mounting flange 6, which slidingly contacts the outer side seal 8, into the cylindrical portion 1b that is hardened to have a surface hardness of 50~64 HRC by high frequency induction hardening.

Double row tapered rollers 28, 28 are rollably contained between the outer raceway surfaces 24a, 24a and the inner raceway surfaces 25a, 26a, via cages 29, 29. Cone back face ribs 25d, 26 are formed on a larger diameter end of the inner raceway surfaces 25a, 26a of the wheel hub 25 and the inner ring 26. In addition, cone front face ribs 26c are formed on the smaller diameter end of the inner raceway surface 26a of the inner ring 26 to prevent the tapered rollers 28 from falling off from the inner raceway surface 26a.

According to this embodiment, the stepped portion 15 of the wheel mounting flange 6 is formed with a combined circular arc cross-section with two predetermined radii of curvatures Ra, Rb. This makes it possible to reduce the weight of the wheel hub 25 and to further relax the stress concentration caused on the wheel hub 25 by a bending moment loaded on the wheel mounting flange 6. Thus, this further increases the strength and durability of the wheel bearing apparatus. Also in this embodiment, the annular recessed portion 13 is formed on an inner circumference of the outer side end of the outer member 24. The annular recessed portion 13 is arranged opposite to a corner edge of the stepped portion 15, via a small gap. The gap forms an annular labyrinth seal 14 having a substantially "L" shaped cross-section. The labyrinth seal 14 prevents direct exposure of the seal 8 to rain water or dust. Thus, it is possible to provide a vehicle wheel bearing apparatus that improves the sealability and durability of the seal 8 and extends its life.

The present disclosure can be applied to wheel bearing apparatus of the third generation or fourth generation of the inner ring rotation type.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A vehicle wheel bearing apparatus comprising:
    an outer member formed with a body mounting flange on its outer circumference, the body mounting flange is to be mounted on part of a suspension apparatus of the vehicle, an inner circumference of the outer member includes double row outer raceway surfaces;
    an inner member includes a wheel hub and an inner ring or an outer joint member of a constant velocity universal joint, the wheel hub is formed, on one end, with a wheel mounting flange, an outer circumference of the wheel hub includes one inner raceway surface positioned opposite to one of the double row outer raceway surfaces, a cylindrical portion axially extends from the inner raceway surface, and the inner ring is press-fit onto the cylindrical portion of the wheel hub, an outer circumference of the inner ring includes the other inner raceway surface positioned opposite to the other of the double row outer raceway surfaces;
    double row rolling elements are freely rollably contained between the inner raceway surfaces of the inner member and the outer raceway surfaces of the outer member;
    seals are mounted within annular openings formed between the outer member and the inner member, an outer side seal of the seals slidably contacts a base of the wheel mounting flange, the base has a circular arc cross-section on an inner side of the wheel mounting flange;
    a stepped portion is formed between an inner side surface of the wheel mounting flange and its base, the stepped portion is formed with a combined circular arc cross-section wherein the combined circular arc cross-section is positioned between the wheel mounting flange and a corner edge of the stepped portion, and the combined circular arc cross-section having two predetermined radii of curvatures; and
    an annular recessed portion is formed on an inner circumference of the outer side end of the outer member, the recessed portion is formed opposite to the corner edge of the stepped portion via a small gap, the gap forms an annular labyrinth seal having a substantially "L" shaped cross-section.

2. The vehicle wheel bearing apparatus of claim 1, wherein a pitch circle diameter of the rolling elements of outer side row of the double row rolling elements is set larger than a pitch circle diameter of the rolling elements of the inner side row of the double row rolling elements, and an outer diameter of the stepped portion is set larger than an outer diameter of a pilot portion.

3. The vehicle wheel bearing apparatus of claim 2, wherein the number of the rolling elements of the outer side row is set larger than the number of the rolling elements of the inner side row.

4. The vehicle wheel bearing apparatus of claim 2, wherein the diameter of each of the rolling elements of the outer side row is set smaller than the diameter of each of the rolling elements of the inner side row.

5. The vehicle wheel bearing apparatus of claim 2, wherein a substantially axially extending conical recess is formed on the outer side end of the wheel hub and extends to near the bottom of the inner raceway surface of the outer side so as to make the wall thickness of the outer side of the wheel hub substantially constant.

6. The vehicle wheel bearing apparatus of claim 2, wherein a cylindrical portion of a larger diameter and a cylindrical portion of a smaller diameter are formed on the inner circumference of the outer member between the double row outer raceway surfaces and a tapered stepped portion is formed between the cylindrical portions, and wherein the bottom diameter of the outer raceway surface of the inner side is substantially the same as the diameter of the larger cylindrical portion.

* * * * *